United States Patent [19]

Levy et al.

[11] Patent Number: 4,771,161
[45] Date of Patent: Sep. 13, 1988

[54] ELECTRICALLY HEATED TOOL FOR USE IN INSTALLATION OF ANCHORING DEVICES EMPLOYING HOT MELT ADHESIVE

[75] Inventors: Edward D. Levy, Stuart, Fla.; Edward H. Meisner, Short Hills, N.J.; Michael P. Ballone, New Providence, N.J.; Carson E. Ahlman, Oradell, N.J.

[73] Assignee: Parker Manufacturing Company, Worcester, Mass.

[21] Appl. No.: 47,014

[22] Filed: May 6, 1987

[51] Int. Cl.⁴ .......................... H05B 3/00; H05B 1/00
[52] U.S. Cl. .................................. 219/228; 156/320; 156/579; 156/583.1; 219/230; 219/240; 219/243; 219/533
[58] Field of Search ............... 219/221, 228, 230, 240, 219/241, 243, 533; 156/320, 579, 583.1

[56] References Cited

U.S. PATENT DOCUMENTS 3,539,766 11/1970 Eder .................................. 219/228 X
3,593,001 7/1971 Simpson et al. ................. 219/241 X
3,719,792 3/1973 Cuccaro .............................. 219/230

*Primary Examiner*—Anthony Bartis
*Attorney, Agent, or Firm*—Samuels, Gauthier, Stevens & Kehoe

[57] ABSTRACT

An electrically heated tool for appying an anchoring device having a forwardly protruding nose carrying a hot melt adhesive and a rear recess surrounded by a circular rim has a housing having a head portion and a handle. The head portion has a planar front wall provided with a front recess dimensioned to receive the anchoring device. An electric heater in the head portion has a platen, dimensioned to extend into the rear recess of the anchoring device, protruding into the front recess. The dimensions of the front recess and platen are such that the nose of an anchoring device received in the front recess with the platen extending into the rear recess of the device and in contact with the rear of the nose thereof protrudes slightly forwardly beyond the plane of the front wall so that the nose of the device can be firmly pressed against a surface to obtain secure bonding of the device after the heater has been energized to melt the adhesive. The head portion and the front recess therein have a maximum width dimension less than the diameter of the circular rim of the anchoring device whereby portions of the rim extend beyond the sides of the head portion to allow the user to easily and safely grip the anchoring device for placement onto the platen in the front recess.

11 Claims, 1 Drawing Sheet

U.S. Patent     Sep. 13, 1988     4,771,161
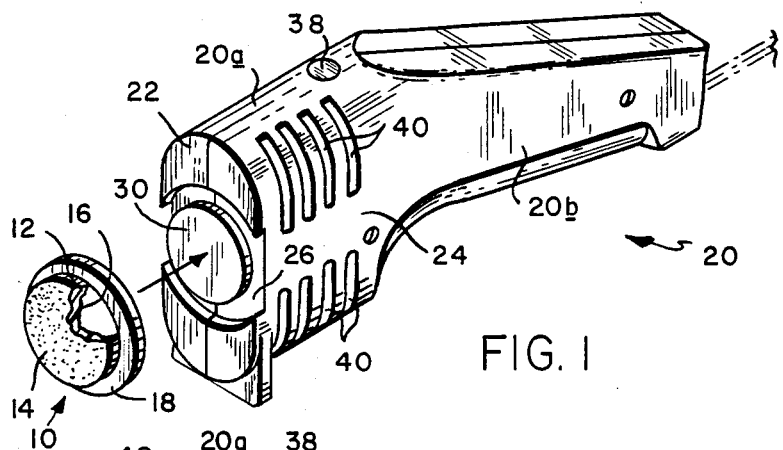
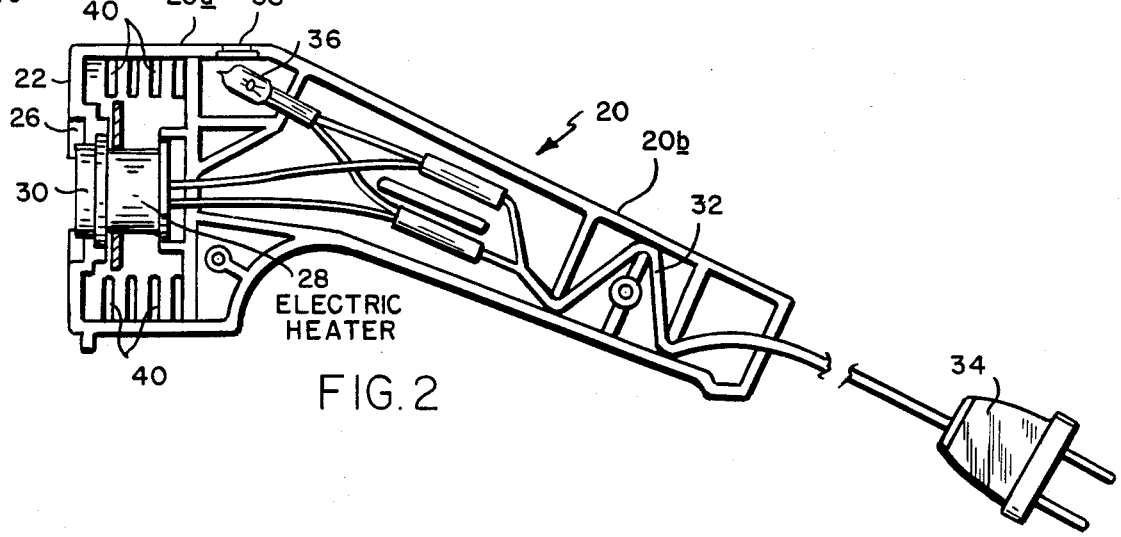
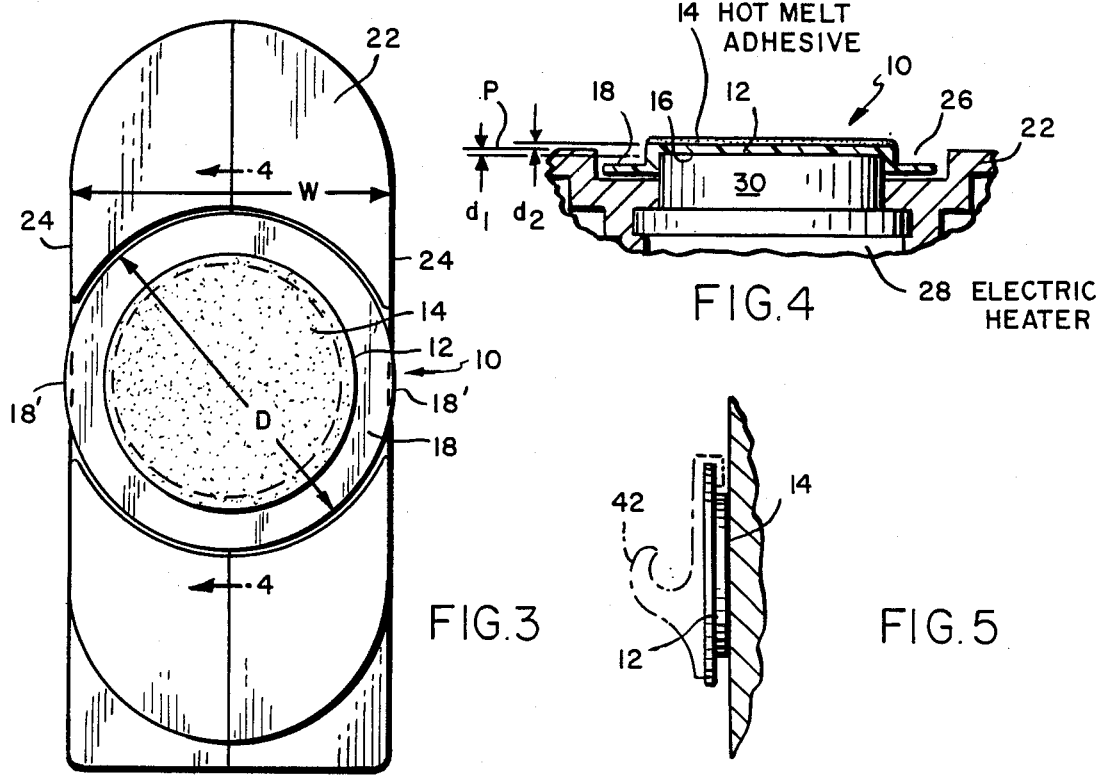

ELECTRICALLY HEATED TOOL FOR USE IN INSTALLATION OF ANCHORING DEVICES EMPLOYING HOT MELT ADHESIVE

BACKGROUND OF THE INVENTION

1. Field of the Invention

This invention relates to an improved tool for melting hot melt adhesive on a fastening device as a preliminary step to bonding the fastening device to a mounting surface.

2. Description of the Prior Art

It is known to employ hot melt adhesives to bond anchoring devices to walls and other like mounting surfaces. Special tools are required to heat the anchoring devices and thereby melt the adhesives.

U.S. Pat. No. 3,719,792 discloses one such tool where the anchoring device is received against the face of a relatively larger forwardly protruding heating element. In situations where a plurality of anchoring devices are being heated in rapid succession, the areas of the heating element which extend beyond the anchoring devices are exposed and thus may be contacted by a user's fingers.

U.S. Pat. No. 4,167,259 discloses another prior are tool which is used in conjunction with a metal anchoring device. The anchoring device is specially configured and dimensioned to complete a magnetic flux circuit between the legs of a U-shaped induction core, thereby generating the heat required to melt the adhesive. This type of arrangement requires rather precise positioning of the anchoring device on the tool, and precludes the use of non-metallic anchoring devices, e.g., those molded of plastic.

One object of the present invention is to provide a tool which is specially adapted to conveniently and safely accept an anchoring device for heating.

A companion objective of the present invention is to provide a tool which can be employed with both metallic and non-metallic anchoring devices.

SUMMARY OF THE INVENTION

The tool of the present invention is designed for use in applying an anchoring device having a forwardly protruding nose carrying hot melt adhesive and a rear recess surrounded by a circular rim. The fastening device may be metallic or non-metallic. The tool has a housing with both a head portion and a handle portion. The head portion has a front wall with a front recess, and oppositely facing side walls extending rearwardly from the front wall. A heater is contained in the head portion. The heater has a platen protruding through the front wall into the front recess. The front recess is appropriately configured and dimensioned to removably receive a fastening device on the platen, with the platen protruding into the rear recess of the thus received anchoring device and into contact with the nose thereof. The heater is adapted to heat the platen and the nose of the anchoring device in contact therewith to melt the adhesive preparatory to pressing the nose of the anchoring device against a support surface. The platen is totally enclosed by the anchoring device received thereon.

Advantageously, the width of the tool's head portion between the side walls is less than the diameter of the circular rim on the anchoring device, thus allowing portions of the rim to protrude laterally beyond the side walls. These laterally protruding rim portions allow the anchoring device to be held between the fingers of the user and provide a means of easily and safely mounting the anchoring device on the heated platen.

To further enhance safety, the platen is located rearwardly of the plane of the front wall of the head portion. Preferably, this rearward location is at a distance which is slightly less than the thickness of the nose of the anchoring device. Thus, when the anchoring device is mounted on the platen, it protrudes slightly beyond the plane of the front wall to faciliate application to the mounting surface.

Other objects and advantages of the present invention will become more apparent as the description proceeds with the aid of the accompanying drawings wherein:

BRIEF DESCRIPTION OF THE DRAWINGS

FIG. 1 is a perspective view of a tool and anchoring device in accordance with the present invention;

FIG. 2 is a longitudinal sectional view taken through the tool shown in FIG. 1;

FIG. 3 is a front view of the tool with an anchoring device received on the platen;

FIG. 4 is a sectional view taken along line 4—4 of FIG. 3; and

FIG. 5 is a partial sectional view showing the anchoring device bonded to a mounting surface.

DESCRIPTION OF PREFERRED EMBODIMENT

With reference to the drawings, the tool of the present invention is designed for use with an anchoring device generally indicated at 10. The anchoring device has a forwardly protruding nose 12 carrying hot melt adhesive 14, and a rear recess 16 surrounded by a circular rim 18.

The tool 20 of the present invention has a head portion 20a and a handle portion 20b. The head portion includes a front wall 22 with oppositely facing side walls 24 extending rearwardly therefrom, and with a front recess 26 in the front wall. A heater 28 is contained in the head portion 20a. The heater includes a platen 30 which protrudes through the front wall into the front recess 26. The front recess 26 is appropriately configured and dimensioned to receive the anchoring device 10 on the platen 30, with the platen protruding into the rear recess 16 of the thus received anchoring device and into contact with the underside of the nose 12. The platen 30 is thus totally enclosed by the anchoring device. The heater 28 is of the electrical resistance type and is adapted to be connected via wire 32 and plug 34 to a conventional electrical outlet (not shown). An indicator light 36 is included in the circuit and is visible through a window 38 in the housing. Light 36 provides a means of visually indicating when the heater is energized.

When energized, the heater raises the temperature of the platen 30 and the nose 12 of an anchoring device in contact therewith to melt the adhesive coating 14 preparatory to pressing the nose of the fastening device against a support surface. This results in the anchoring device becoming bonded to the support surface, as shown for example in FIG. 5.

As can best be seen in FIG. 3, the maximum width dimension "W" of the head portion 20a between the side walls 24 is less than the diameter "D" of the circular rim 18 on the anchoring device 10. Thus, when the anchoring device is mounted on the platen 30, portions of the rim 18 protrude laterally beyond the side walls 24, such laterally protruding portions being indicated in FIG. 3 at 18'. These laterally protruding portions can be gripped between a user's fingers, thereby providing a convenient and safe means of handling the anchoring device without exposure to the heated platen 30.

In order to further enhance safety, the platen 30 is preferably recessed rearwarly of the plane "P" of the front wall 22 by a distance $d_1$. Distance $d_1$ is less than the thickness of the nose portion 12. Thus, when the anchoring device is mounted on the platen, the nose portion protrudes forwardly beyond the plane P by a slight distance $d_2$. Typically, $d_1$ will be 0.015", the thickness of the nose 12 will be 0.030", thus making $d_2$ also approximately 0.015".

By locating the platen 30 slightly behind the plane P of the front wall 22, there is less likelihood of it being inadvertently contacted by the user. The slight forward protrusion of the nose 12 beyond the plane P enables the nose to be firmly pressed against a mounting surface to obtain secure bonding, with the remainder of the front wall 22 serving as a guide surface which resists cocking of the tool and thereby further enhances secure bonding.

As can be best seen in FIG. 4, when the anchoring device is mounted on the platen 30, the circular flange 18 is spaced forwardly from the base of the recess 26. This insures that there is intimate contact between the platen and the rear surface of the nose 12, thereby enhancing rapid and efficient heating.

Preferably, the side walls 24 are provided with vent openings indicated typically at 40. This allows ambient air to circulate freely through the head portion 20a.

As indicated in FIG. 5, once the anchoring device 10 is securely bonded to a mounting surface, it serves as a base for removably supporting hooks or other like elements, as indicated for example by the broken lines at 42.

Various changes and modifications can be made to the embodiment herein chosen for purposes of disclosure without departing from the scope of the coverage provided by the claims appended hereto. Examples of such changes and modifications might include changing the configuration of the platen 30 to accommodate differently configured anchoring devices, elimination of the indicator light 36, heating the platen 30 by means other than an electrical resistance heater, etc.

We claim:

1. A tool for applying an anchoring device to a support surface, the anchoring device having a forwardly protruding nose carrying hot melt adhesive and a rear recess surrounded by a circular rim, said tool comprising:

a housing having a head portion;

a front wall on said head portion with oppositely facing side walls extending rearwardly therefrom, said front wall having forwardly protruding portions defining a front reference plane, with a front recess in said front wall located rearwardly of said front reference plane;

a heater in said head portion, said heater having a platen protruding through said front wall into said front recess, said front recess being dimensioned to removably receive one of the anchoring devices on said platen, the dimensions of said front recess and said platen being such that the nose of the thus received anchoring device protrudes forwardly beyond said front reference plane, with said platen being dimensioned to protrude into the rear recess of the thus received anchoring device and into contact with the nose thereof, said heater being adapted to heat said platen and the nose of the anchoring device in contact therewith to melt said adhesive preparatory to pressing the nose of said anchoring device against said support surface.

2. The tool of claim 1 wherein said front recess extends across the entire width of said front wall, and the outer diameter of the rim on the anchoring device is greater than the width of said front wall, whereupon the rim of the thus received anchoring device protrudes laterally beyond the side walls of said head portion.

3. The tool of claim 1, wherein said platen is located rearwardly of said front reference plane.

4. The tool of claim 3 wherein said distance between said platen and said front reference plane is less than the thickness of said nose.

5. The tool of claim 1 wherein said head portion is provided with a maximum width dimension between said side walls which is less than the diameter of the circular rim of the anchoring device.

6. The tool of claim 1 wherein the extent to which said platen protrudes forwardly from the bottom of said front recess is greater than the depth of the rear recess in the anchoring device, whereupon the rim of the thus received anchoring device is spaced from the bottom of said front recess.

7. The tool of claim 1 wherein said housing further includes a handle portion extending rearwardly from said head portion, and wherein said heater is electrically energized by electrical power supply conduit means extending through said handle portion.

8. The tool of claim 7 wherein said conduit means includes an indicator light visible through a window in said housing.

9. The tool of claim 1 further comprising vent openings in said side walls for allowing ambient air to circulate through said head portion.

10. A tool for applying an anchoring device to a support surface, the anchoring device having a forwardly protruding nose carrying hot melt adhesive and a rear recess surrounded by a circular rim, said tool comprising:

a housing having a head portion;

a substantially planar front wall on said head portion with oppositely facing side walls extending rearwardly therefrom, said front wall having a front recess;

a heater in said head portion, said heater having a platen protruding through said front wall into said front recess, said front recess extending across the entire width of said front wall and being dimensioned to removably receive one of the anchoring devices on said platen, the dimensions of said front recess of said platen being such that the nose of the thus received anchoring device protrudes forwardly beyond the plane of said front wall, with said platen being dimensioned to protrude into the rear recess of the thus received anchoring device and into contact with the nose thereof, and with the outer diameter of the rim on the thus received anchoring device being greater than the width of said front wall to thereby protrude laterally beyond said side walls, said heater being adapted to heat said platen and the nose of the anchoring device in contact therewith to melt said adhesive preparatory to pressing the nose of said anchoring device against said support surface.

11. A tool for applying an anchoring device to a support surface, the anchoring device having a forwardly protruding nose carrying hot melt adhesive and a rear recess surrounded by a circular rim, said tool comprising:
   a housing having a head portion;
   a substantially planar front wall on said head portion with oppositely facing side walls extending rearwardly therefrom, said front wall having a front recess;
   a heater in said heat portion, said heater having a platen protruding through said front wall into said front recess, said front recess being dimensioned to removably receive one of the anchoring devices on said platen, the dimensions of said front recess and said platen being such that the nose of the thus received anchoring device protrudes forwardly beyond the plane of said front wall, with said platen being dimensioned to protrude into the rear recess of the thus received anchoring device and into contact with the nose thereof, said head portion having a maximum width dimension between said side walls which is less than the diameter of the circular rim of the thus received anchoring device, said heater being adapted to heat said platen and the nose of the anchoring device in contact therewith to melt said adhesive preparatory to pressing the nose of said anchoring device against said support surface.

* * * * *